US010300860B2

(12) United States Patent
Bathelier et al.

(10) Patent No.: US 10,300,860 B2
(45) Date of Patent: May 28, 2019

(54) VEHICLE REAR ASSEMBLY

(71) Applicant: FAURECIA AUTOMOTIVE INDUSTRIE, Nanterre (FR)

(72) Inventors: Xavier Bathelier, Saint Pierremont (FR); Steve Jeunesse, Mouzon (FR)

(73) Assignee: Faurecia Automotive Industrie, Nanterre (FR)

( * ) Notice: Subject to any disclaimer, the term of this patent is extended or adjusted under 35 U.S.C. 154(b) by 337 days.

(21) Appl. No.: 15/142,235

(22) Filed: Apr. 29, 2016

(65) Prior Publication Data

US 2016/0347254 A1 Dec. 1, 2016

(30) Foreign Application Priority Data

Apr. 29, 2015 (FR) ...................................... 15 53887

(51) Int. Cl.
*B60R 5/04* (2006.01)
*B62D 25/08* (2006.01)

(52) U.S. Cl.
CPC .............. *B60R 5/045* (2013.01); *B60R 5/048* (2013.01); *B62D 25/087* (2013.01)

(58) Field of Classification Search
CPC ........ B60R 5/045; B60R 5/048; B62D 25/087
USPC .................................. 296/37.16, 98, 100.09
See application file for complete search history.

(56) References Cited

U.S. PATENT DOCUMENTS

| 4,277,097 | A | * | 7/1981 | Lalanne | B60R 5/045 |
| 4,351,555 | A | * | 9/1982 | Hashimoto | B60R 5/045 |
| 4,489,660 | A | * | 12/1984 | Tamamushi | B60R 5/045 |
| 4,932,704 | A | * | 6/1990 | Ament | B60R 5/045 |
| 6,113,172 | A | * | 9/2000 | Chaloult et al. | B60R 5/045 |
| 6,918,623 | B2 | * | 7/2005 | Hansen et al. | B60R 5/045 |
| 6,921,119 | B2 | * | 7/2005 | Haspel et al. | B60R 5/045 |
| 2003/0062736 | A1 | * | 4/2003 | Ulert | B60R 5/047 296/24.43 |
| 2005/0073167 | A1 | * | 4/2005 | DeGaillard | B60R 5/045 |
| 2007/0013201 | A1 | * | 1/2007 | Wagner et al. | B60R 5/045 |
| 2012/0063154 | A1 | * | 3/2012 | Cannon | B60R 13/0212 362/490 |
| 2014/0319888 | A1 | * | 10/2014 | Inedia | B60R 5/045 |

(Continued)

FOREIGN PATENT DOCUMENTS

| DE | 2536209 | A | * | 2/1976 | ............ B60R 5/045 |
| DE | 19906648 | A1 | * | 8/2000 | ............ B60R 5/04 |

(Continued)

OTHER PUBLICATIONS

French Search Report, in French, corresponding to FR1553887, dated Mar. 7, 2016, 2 pages.

*Primary Examiner* — Dennis H Pedder
(74) *Attorney, Agent, or Firm* — Reising Ethington P.C.

(57) ABSTRACT

A rear vehicle assembly having: two side trims intended to laterally bound a trunk, and a tray, movable relative to the side trims between a concealing position and a storage position. The tray includes at least one first panel, and one second panel linked to the first panel, defining two side edges of the tray. Each side trim defines a guide path for the tray. The tray includes at least one hinge articulating the first panel to the second panel, such that the side edge of the tray is adapted to cooperate with a respective guide path. And the rear vehicle assembly includes a driving mechanism adapted to drive the tray from the concealing position to the storage position.

16 Claims, 4 Drawing Sheets

(56) References Cited

U.S. PATENT DOCUMENTS

2015/0001874 A1* 1/2015 Maier et al. ............ B60R 5/045
2017/0036609 A1* 2/2017 Huebner ................. B60R 5/045

FOREIGN PATENT DOCUMENTS

| DE | 1800952 A1 * | 6/2007 | ............... B60R 5/04 |
| DE | 102006009771 A1 * | 9/2007 | ............... B60R 5/04 |
| DE | 1876056 A2 * | 1/2008 | ............... B60R 5/04 |
| DE | 1020014211163 A1 | 12/2014 | |
| EP | 1386784 A1 | 2/2004 | |
| EP | 1495887 A2 | 1/2005 | |
| EP | 2918449 A1 * | 9/2015 | ............... B60R 5/04 |
| FR | 2252746 A * | 7/1975 | ............ B60R 5/045 |
| FR | 438000 A * | 7/1991 | ............... B60R 5/04 |
| FR | 2875454 | 3/2006 | |
| FR | 2907725 A1 | 5/2008 | |
| FR | 2990394 A1 * | 11/2013 | ............... B60R 5/04 |
| JP | 58022735 A * | 2/1983 | ............ B60R 5/045 |
| JP | 60244646 A * | 12/1985 | ............... B60R 7/08 |
| JP | 61030443 A * | 2/1986 | ............... B60R 7/08 |
| JP | 06270738 A * | 9/1994 | ............... B60Q 7/00 |
| JP | 2002046539 A * | 2/2002 | ............... B60R 5/04 |
| JP | 2003291733 A * | 10/2003 | ............... B60R 5/04 |
| JP | 2007022166 A | 2/2007 | |
| JP | 2008284940 A * | 11/2008 | ............... B60R 5/04 |
| WO | WO0202371 A1 | 1/2002 | |

* cited by examiner

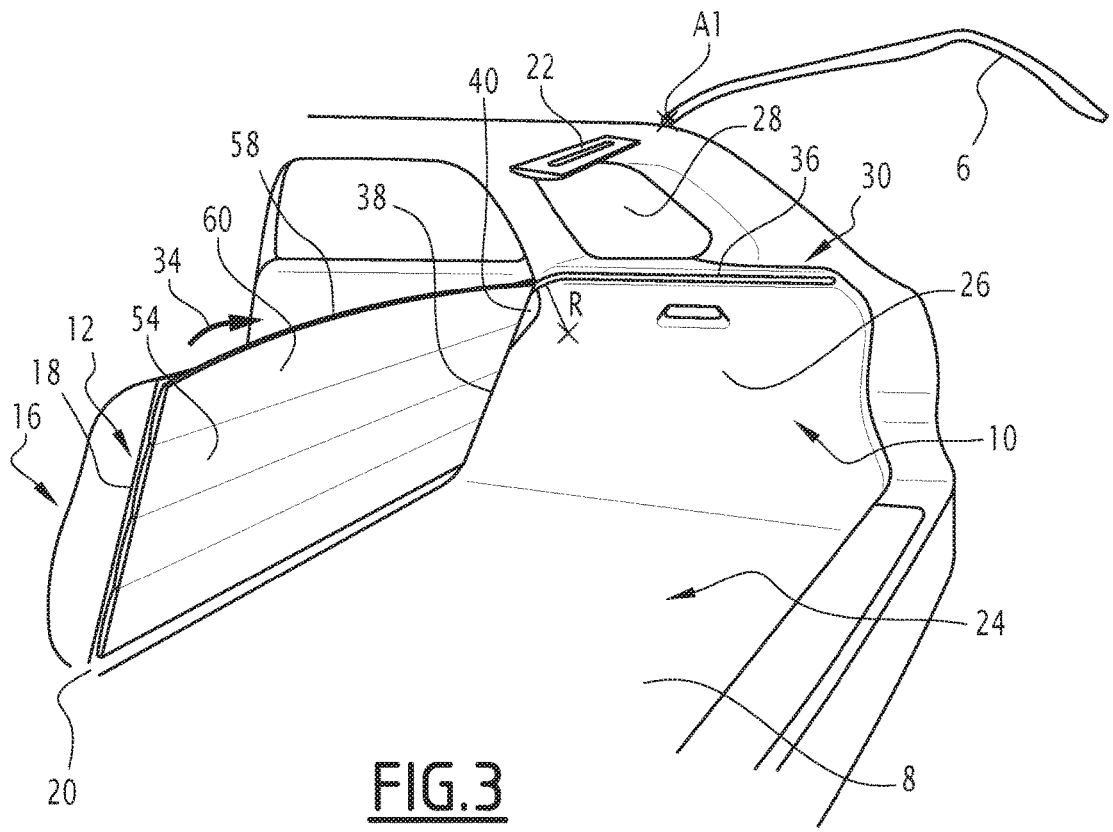
FIG.3
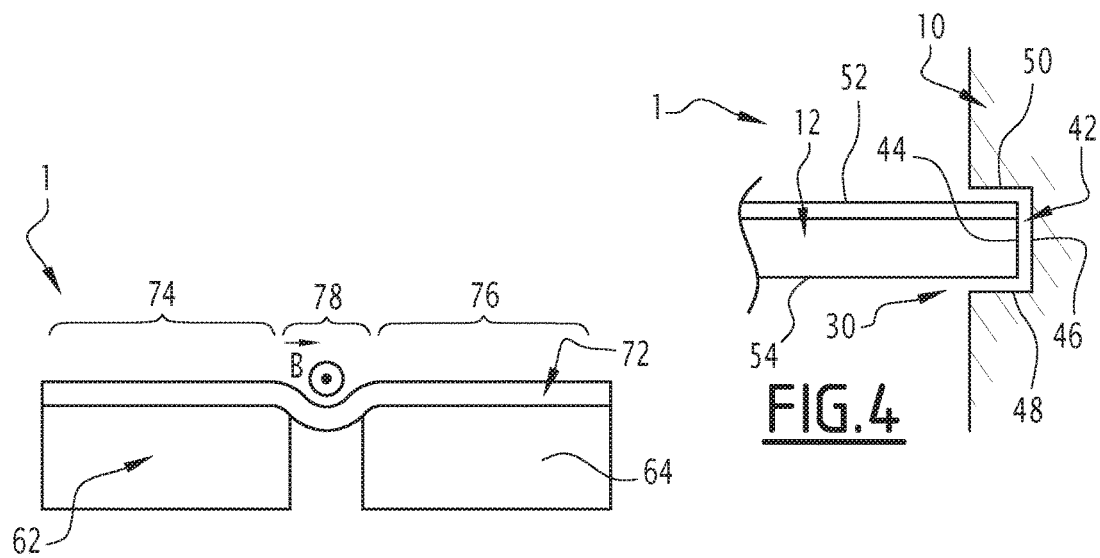
FIG.5
FIG.4
FIG.6

VEHICLE REAR ASSEMBLY

This patent application claims the priority of French application number FR1553887 filed on Apr. 29, 2015, which is incorporated herein by reference.

TECHNICAL FIELD

The present invention relates to a rear vehicle assembly comprising two side trims intended to laterally bound a trunk,
a tray having a front edge and a rear edge, the tray being movable relative to the side trims between a concealing position in which the tray closes off a lower part of the trunk and a storage position,
the tray comprising at least one first panel defining the front edge of the tray and an opposite edge, and a second panel connected to the first panel by the opposite edge, the panels defining two lateral edges of the tray, each lateral edge being intended to be placed with regard to an associated side trim.

Such a rear assembly includes a tray intended to be mounted in the trunk of a motor vehicle to conceal the contents of the bottom part of the trunk, while offering a support surface for objects intended to be placed on the tray.

BACKGROUND

It is known to mount the tray pivoting around a transverse axis of the motor vehicle. For example, the trays are connected to the tailgate by ropes such that opening of the tailgate is accompanied by rising of the tray, which pivots around the transverse axis. The trunk is thus easily accessible.

However, when the tray is in the raised position, the trunk is not completely freed. Furthermore, the tray obstructs light coming from the rear ceiling light of the passenger compartment. Indeed, the trays are opaque to make it possible to conceal objects contained in the lower part of the trunk when the tailgate is closed. This lack of light is not very convenient, in particular when the trunk is open in dimly lit areas.

The trays are furthermore generally removable to allow easier access to the trunk or a larger storage space.

However, removing the removable tray is a tedious operation. Furthermore, the removed tray is cumbersome.

Document FR 2,875,454 describes a removable tray comprising a rigid part and part retractable in the rigid part. However, such a tray does not make it possible to completely conceal the lower part of the trunk. Furthermore, such a tray is difficult to place in the storage position.

SUMMARY

One aim of the invention is to obtain a rear vehicle assembly in which the transition of the tray from the concealing position to the storage position is easy to implement.

To that end, the invention relates to a rear vehicle assembly of the aforementioned type, characterized in that each side trim defines a guide path for guiding the tray between the concealing position and the storage position, in that the tray comprises at least one hinge articulating the first panel to the second panel, such that each side edge of the tray is adapted to cooperate with a respective guide path, and in that the rear vehicle assembly comprises a driving mechanism adapted to drive the tray from the concealing position to the storage position.

The rear assembly may include one or more of the following features, considered alone or according to any technically possible combination(s):

the rear vehicle assembly comprises a seat, defining a rear surface and a housing extending along the rear surface of the seat, the housing being adapted to receive the tray in the storage position.

the rear vehicle assembly comprises a tailgate movable relative to the side trim between an open position for accessing the trunk and a closed position for closing off the trunk, the driving mechanism being arranged to drive the tray toward the storage position when the tailgate enters the open position and to drive the tray toward the concealing position during the passage of the tailgate toward the closed position.

the driving mechanism comprises a motor and/or a control button adapted to activate the change in position of the tray between the concealing position and the storage position.

each guide path includes a trough and each side edge of the tray comprises at least one guide pin protruding in the guide path and adapted to slide in the trough of the associated guide path.

each panel of the tray includes at least two guide pins adapted to cooperate with each respective guide path.

the driving mechanism comprises:

at least one link positioned in a side trim, the link having a linking end to the first panel of the tray and a traction end, the link being movable between a rest position in which the link is adapted to pull the tray toward the concealing position and a working position in which the link is adapted to pull the tray toward the storage position, a traction device of the link adapted to place the link in the working position, a return device of the link adapted to place the link in its rest position.

the traction device comprises a pulley, and the return device comprises a spring.

the driving mechanism comprises a linking member, having a linking configuration in which the linking member is linked to the first panel and a released configuration in which the tray is removable, the linking member being movable between a retracted position and a deployed position, the passage of the linking member between the retracted position and the deployed position driving the passage of the tray between the concealing position and the storage position when the linking member is in the linking configuration.

the rear vehicle assembly comprises a maintaining device adapted to maintain the linking member in the retracted position.

the linking member is a rod including two ends, each end being adapted to cooperate with one of the two guide paths.

the tray comprises a textile cover layer covering each panel, the cover layer having a first covering zone in which it is integral to the first panel, a second covering zone in which it is integral to the second panel, and an intermediate zone between the first covering zone and the second covering zone, the hinge being formed by the intermediate zone of the cover layer.

the rear vehicle assembly comprises a rear panel defining the rear edge of the tray, the tray comprising a hinge articulating each panel to the following panel, such that the side edge of the tray is adapted to cooperate with a respective guide path.

the drive mechanism includes a handle positioned on the rear panel.

the rear vehicle assembly comprises a light source positioned opposite the lower part of the trunk relative to the tray when the tray is in the concealing position, the light source being adapted to light the lower part of the trunk when the tray is in the storage position.

in the storage position of the tray, at least one panel is horizontal.

BRIEF DESCRIPTION OF THE DRAWINGS

The invention will be better understood upon reading the following description, provided solely as an example and done in reference to the appended drawings, in which:

FIG. 3 is a view similar to FIG. 1 of the rear assembly of FIG. 1, the tray being in a storage position;

FIG. 4 is a diagrammatic sectional view of zone IV-IV of the rear assembly of FIG. 1;

FIG. 5 is a diagrammatic sectional view along plane V-V of the tray of FIG. 1;

FIG. 6 is a view similar to FIG. 4 of a rear assembly according to a second embodiment;

DETAILED DESCRIPTION

Figure 1:
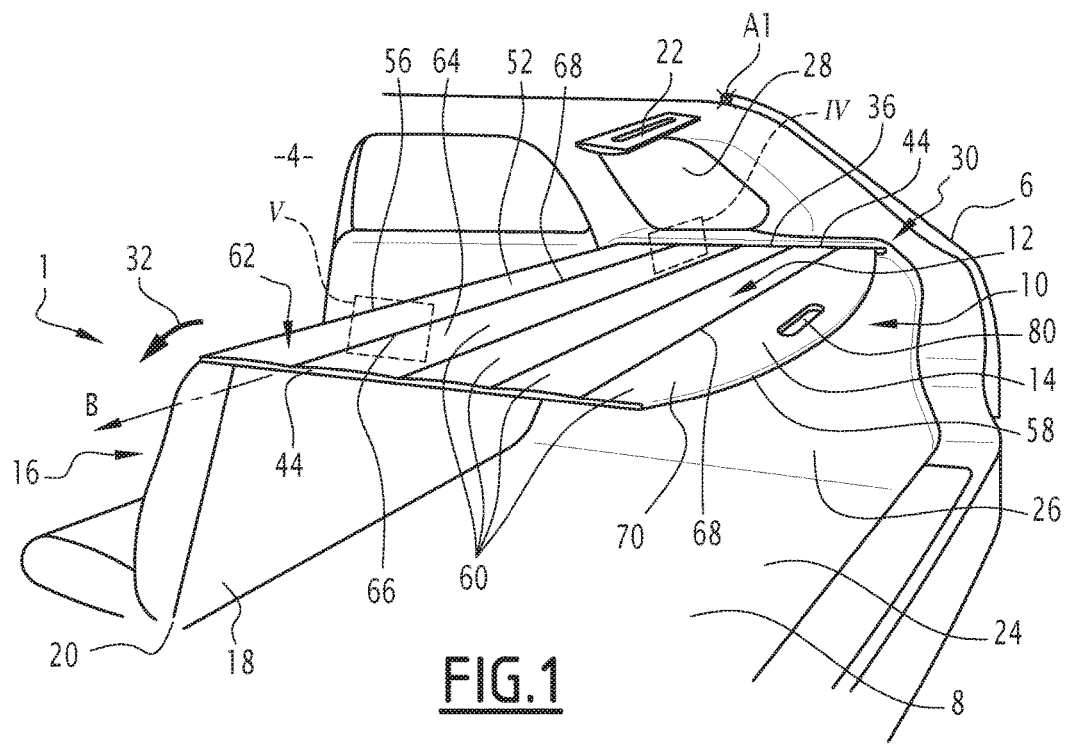
FIG. 1 is a diagrammatic partial perspective side view of a rear motor vehicle assembly, according to a first embodiment of the invention, the tray being in a concealing position.

In the rest of this document, the orientations are the typical orientations of a motor vehicle. Thus, the terms "rear", "front", "upper", "left", "right", "high" and "low" are to be understood in reference to the normal travel direction of a motor vehicle and the position of a driver.

FIGS. 1 to 5 illustrate a rear vehicle assembly 1 according to a first embodiment of the invention.

The vehicle is in particular a motor vehicle. The vehicle defines an inner passenger compartment 4 intended to receive the driver and passengers.

The rear assembly 1 includes a tailgate 6, a floor 8, side trims 10 and a tray 12. The tray 12 is movable relative to the side trims between a concealing position shown in FIG. 1 and a storage position shown in FIG. 3. An intermediate position of the tray 12 between the concealing position and the storage position is also shown in FIG. 2.

The rear vehicle assembly 1 further comprises a driving mechanism 14 adapted to drive the tray 12 from the concealing position to the storage position.

Furthermore, the rear assembly 1 comprises at least one seat 16. The seat 16 defines a rear surface 18.

Advantageously, the rear vehicle assembly 1 includes a housing 20 extending along the rear surface 18 of the seat 16. The housing 20 is adapted to receive the tray 12 in the storage position.

Furthermore, the rear vehicle assembly 1 advantageously includes a light source 22.

The rear assembly 1 defines a rear trunk 24 of the vehicle. The trunk 24 is a space defined toward the front by the seat 16, on the sides by the side trims 10, on the bottom by the floor 8, on the top by the ceiling of the vehicle, and to the rear by the tailgate 6.

The trunk 24 has a lower part 26 and an upper part 28 defined relative to one another by the tray 12, when the tray 12 is in the concealing position.

The volume of the lower part 26 of the trunk 24 is for example suitable for containing a suitcase or parcels.

Figure 2:
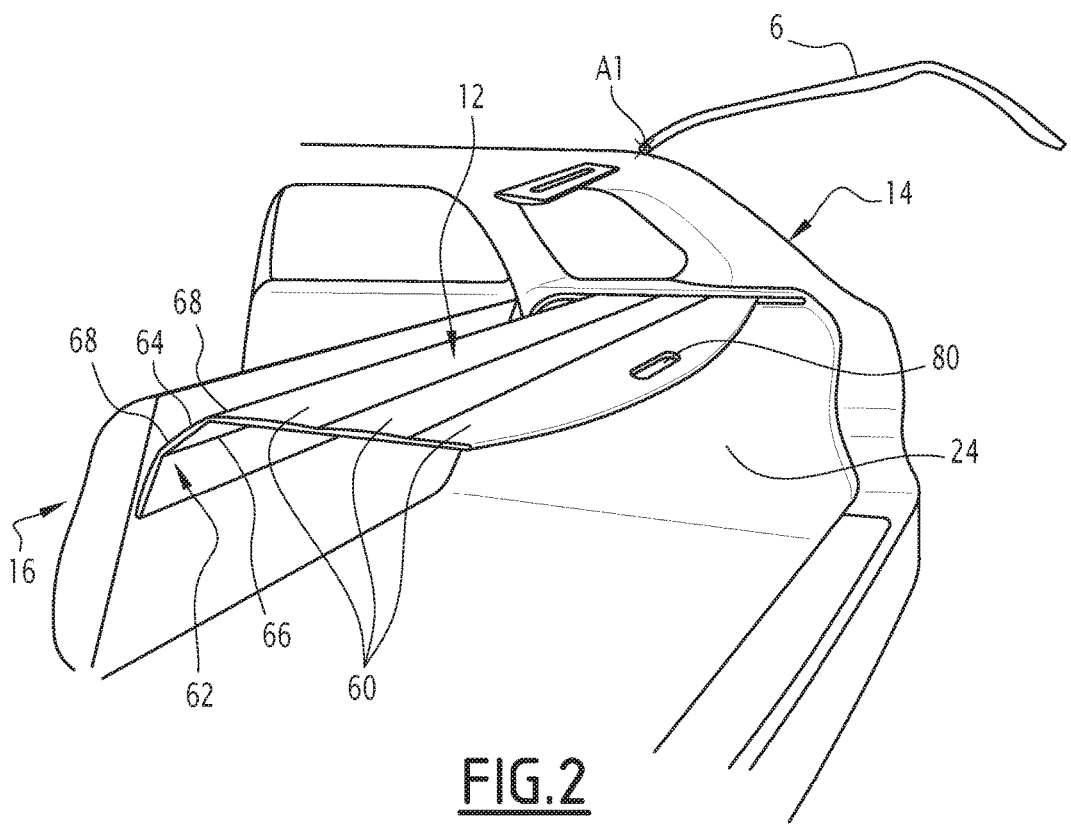
FIG. 2 is a view similar to FIG. 1 of the rear assembly of FIG. 1, the tray being in an intermediate position.

The tailgate 6 is articulated on the body of the motor vehicle between a closed position closing off the trunk 24, shown in FIG. 1, and an open position for accessing the trunk 24, shown in FIG. 2 and FIG. 3.

The tailgate 6 is for example articulated around a substantially horizontal rotation axis A1. In the closed position, the tailgate 6 closes off the trunk 24 toward the rear. In the open position, the tailgate 6 is raised toward the rear and top to free access to the trunk 24 from the rear of the vehicle.

Each side trim 10 defines a guide path 30 for guiding the tray 12 between the concealing position and the storage position.

The tray 12 is movable along the guide path 30 in a storage position depicted by arrow 32 in FIG. 1 or in a deployment direction depicted by arrow 34 in FIG. 3.

Advantageously, the two guide paths 30 are parallel.

Each guide path 30 includes a rear portion 36, a front portion 38 and a junction portion 40 between the rear portion 36 and the front portion 38.

The rear portion 36 is substantially horizontal. The rear portion 36 is adapted to keep the tray 12 in the concealing position.

The front portion 38 is substantially vertical. The front portion 38 extends along the rear surface 18 of the seat 16. The front portion 38 is adapted to keep the tray 12 in the storage position.

The junction portion 40 extends from the rear portion 36 to the front portion 38.

The junction portion 40 is substantially curved. For example, the junction portion 40 has a curve radius R comprised between 10 cm and 20 cm.

The junction portion 40 is adapted to allow the passage of the tray 12 from the concealing position to the storage position.

As illustrated in FIG. 4, each guide path 30 includes a trough 42 adapted to cooperate with a side edge 44 of the tray 12.

The trough 42 is defined by a bottom wall 46, a lower side wall 48 and an upper side wall 50.

The bottom wall 46 extends substantially vertically.

The side walls 48, 50 are substantially perpendicular to the bottom wall 46. For example, the lower side wall 48 and the upper side wall 50 are parallel to one another. They extend substantially horizontally in the rear portion 36 and substantially vertically in the front portion 38.

The trough 42 is adapted to receive a lateral edge 44 of the tray 12, in a complementary manner.

The walls 46, 48, 50 of the trough 42 make it possible to keep the tray 12 in the guide path 30. The movement of the tray 12 exclusively follows the guide path 30 in the storage direction 32 or in the deployment direction 34.

Advantageously, in the rear portion 36, the trough 42 has an open rear end in order to allow the removal of the tray 12 when the tray is moved in the deployment direction 34 from the concealing position.

The tray 12 has an upper face 52 and a lower face 54 parallel to the upper face 52. Upper face 52 refers to the face of the tray 12 that faces upward when the tray 12 is in the concealing position. Lower face 54 refers to the face of the tray 12 that faces downward when the tray 12 is in the concealing position.

In the concealing position, the tray 12 is intended to close off the lower part 26 of the trunk 24 upwardly and to support objects placed on the upper surface 52.

In the concealing position, the upper face 52 and the lower face 54 are substantially planar, and the tray 12 is substantially horizontal.

The tray 12 extends transversely between a left side edge 44 and a right side edge 44. Each side edge 44 is intended to be placed with regard to an associated side trim 10.

The tray 12 extends longitudinally between a front edge 56 and a rear edge 58.

The tray 12 closes off the lower part 26 of the trunk 24 when the tray 12 is in the concealing position.

The thickness of the tray 12 is smaller than its longitudinal and transverse dimensions.

The tray 12 is rigid enough to support, by bearing on its upper face 52 when it is in the concealing position, without deformation, objects with a non-negligible mass, for example weighing more than 1000 g, and generally weighing between 5 kg and 10 kg depending on the tray 12.

When the tray 12 is in the storage position, the lower part 26 and the upper part 28 of the trunk 24 constitute a continuous volume with no bulk, as shown in FIG. 3.

In the storage position, the tray 12 is positioned substantially vertically. In the storage position, the upper face 52 of the tray 12 faces toward the front, the lower face 54 of the tray 12 facing toward the rear.

In the storage position, the tray 12 is for example positioned along the seat 16 of the vehicle. If applicable, the tray 12 in the storage position is positioned in the housing 20.

The tray 12 comprises a plurality of panels 60.

The tray 12 comprises at least one first panel 62 and one second panel 64 linked to the first panel 62. The first panel 62 defines the front edge 56 of the tray 12 and an opposite edge 66. The second panel 64 is linked to the first panel 62 by the opposite edge 66. Furthermore, the tray comprises a hinge 68 articulating the first panel 62 to the second panel 64.

In the alternative shown in FIGS. 1 to 3, the tray 12 comprises a series of five panels 60. The tray 12 comprises a hinge 68 articulating each panel 60 to the following panel 60.

Each hinge 68 extends along a transverse hinge axis B. The hinge axes B are parallel to one another.

The panels 60 of the tray 12 define the side edges 44 of the tray 12.

A rear panel 70 defines the rear edge 58 of the tray 12.

The number of panels 60 making up the tray 12 is adapted to the guide path 30. In particular, the longitudinal dimension of the panels 60 and the distance between the successive hinges 68 is adapted to the curvature R of the junction portion 40.

For example, each panel 60 has the same length along the longitudinal direction. The length of the panels 60 is smaller than the curve radius R of the junction portion 40. For example, the length of the panels 60 is smaller than 15 cm.

Figure 9:
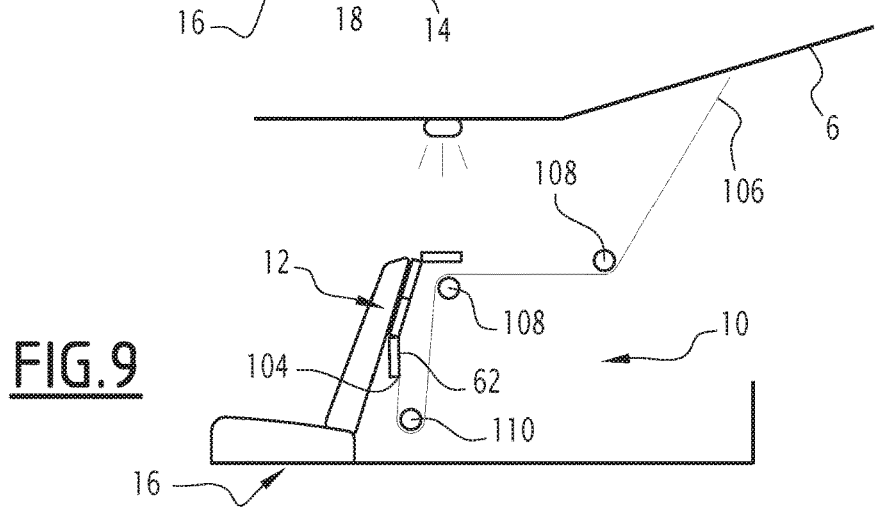
FIG. 9 is a view similar to FIG. 8 of the rear assembly of FIG. 8, the tray being in the storage position.

In one alternative embodiment of the invention, the last panel 70 remains in the horizontal position when the tray 12 is moved in its storage position. This option is shown in FIG. 9, where one sees that the last panel 70 has remained in a horizontal position. This can prevent any objects that may have been placed on the tray 12 in its concealing position from falling into the lower part 26 of the trunk 24. In this case, the last panel 70 can have a different length from that of the other panels 60.

Each panel 60 is advantageously formed from a composite made from a mixture of glass fibers and fibers with a base of thermofusible materials. Such a material is marketed under the name "Sommold".

A cross-section showing the first panel 62, the second panel 64 and their hinge 68 is shown in FIG. 5.

Furthermore, the tray 12 comprises a cover layer 72 covering each panel 60.

The cover layer 72 is made from textile. The cover layer 72 is flexible.

The cover layer 72 can consist of any non-extensible textiles such as fabrics or nonwovens, for example of the needled type.

In particular, the fabric can be made from shielded yarns for example having a core in the form of a polyethylene (PET) filament are surrounded by a polyvinyl chloride (PVC) sheath.

The cover layer 72 has a first covering zone 74 in which it is integral to the first panel 62, a second covering zone 76 in which it is integral to the second panel 64, and an intermediate zone 78 between the first covering zone 74 and the second covering zone 76.

The hinge 68 is formed by the intermediate zone 78 of the cover layer 72.

The hinge 68 allows the first panel 62 to be rotatable relative to the second panel 64 around the hinge axis B.

The rotational mobility along the hinge axis B allowed by the hinge is adapted to the curve radius R of the guide path 30.

The cover layer 72 is continuous. Likewise, the cover layer 72 is integral to each panel 60, and each intermediate zone 78 between two panels forms a hinge 68.

The driving mechanism 14 for example comprises a motor and/or control button adapted to activate the position change of the tray 12 between the concealing position and the storage position.

As shown in FIGS. 1 to 3, 14, the driving mechanism 14 includes a handle 80.

The handle 80 is positioned on the rear panel 70.

The handle 80 makes it possible to drive the movement of the tray 12 between its concealing position and its storage position in the deployment direction 34 or in the storage direction 32. In a complementary manner, the handle 80 allows the removal of the tray 12.

The light source 22 is positioned opposite the lower part 26 of the trunk 24 relative to the tray 12 when the tray 12 is in the concealing position.

Furthermore, the light source 22 is adapted to light the lower part 26 of the trunk 24 when the tray 12 is in the storage position.

For example, the light source 22 is fixed to the ceiling of the vehicle, as illustrated in FIGS. 1 to 3. Alternatively, the light source 22 is positioned on an upper part of the tailgate 6. Alternatively, the light source 22 is situated at the front of the truck 24 in the passenger compartment 4 above the seats 16 of the passengers or the like.

The light source 22 can be steered between an off state and an on state. For example, the light source 22 comprises a lightbulb and/or a light-emitting diode.

The operation of the rear assembly 1 will now be described.

After opening the tailgate 6, the user moves the tray 12 toward its storage position using the driving mechanism 14.

For example, the user pushes the tray 12 or activates the movement of the tray 12 by pressing on the control button.

The tray 12 is driven to its storage position by the driving mechanism 14 following the guide path 30 defined in the side trims 10.

The tray 12 slides along the side guide paths 30 in the storage direction 32. The rotation of the first panel 62 relative to the second panel 64 allowed by the hinge 68 makes it possible for the first panel 62 to tilt in the junction portion 40, then to descend in the front portion 38 of the guide paths 30.

Likewise, each panel 60 translates substantially horizontally along the rear portion 36 before inclining along the junction portion 40, then translating substantially vertically along the front portion 38.

For example, in FIG. 2 showing an intermediate position, the first panel 62 is in the front portion 38 of the guide paths 30, the second panel 64 is in the junction portion 40 of the guide path 30, and the other panels 60 are in the rear portion 36 of the guide path. The second panel 64 is inclined relative to the first panel 62 and relative to the other panels 60 using the two hinges 68.

Advantageously, the light source 22 lights up when the tailgate 6 is opened. The light source 22 illuminates the lower part 26 of the trunk 24, while the tray 12 is in its storage position. It should be noted that the lights coming from other light sources such as the interior lights, for example the front ceiling light, the outside lights of the vehicle or the headlights or lights from the outside environment, also make it possible to light the lower part 26 of the trunk 24.

Furthermore, as long as the tray 12 is in the storage position, the volume of the trunk 24 is maximal.

The tray is returned to its concealing position for its trunk concealing role and/or to support objects on its upper face 52 using the driving mechanism 14.

Advantageously, the tray is placed in the concealing position when the tailgate 6 is in the closed closing off position.

For example, the user pulls the rear panel 70 of the tray 12 by the handle 80 toward its concealing position. Alternatively, the user activates the movement of the tray 12 by pressing on the control button. The tray 12 is driven to its concealing position by the driving mechanism 14. The tray 12 slides along the side guide paths in the deployment direction 34.

Furthermore, the user can use the activation button to periodically place the tray 12 in the storage position, the tailgate 6 being closed.

When the user needs a continuous space in the passenger compartment 4 larger than the trunk 24 to transport a large object, the tray 12 is removed completely. Advantageously, the seat 16 is removed or folded down.

For example, the motorization of the driving mechanism 14 is deactivated before removing the tray 12.

For example, the user pulls on the handle 80, so that the tray slides via the guide path past the rear end of the trough 42. When the first panel 62 completely leaves the guide path 30, the tray 12 is removed.

A rear vehicle assembly 90 according to a second embodiment will now be described. The rear assembly according to the second embodiment 90 differs from the rear assembly 1 according to the first embodiment in that each side edge 44 of the tray 12 comprises at least one guide pin 92 protruding in the guide path 30.

FIG. 6 shows a view similar to FIG. 4 of part of the rear assembly 90 according to the second embodiment.

Figure 7:
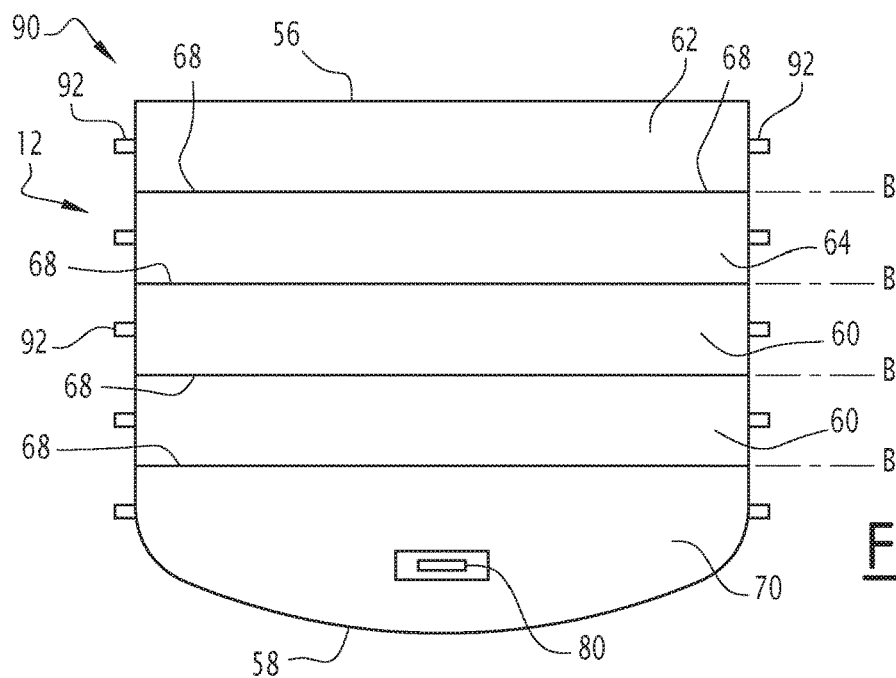
FIG. 7 is a diagrammatic top view of the tray of the rear assembly of FIG. 6.
Figure 8:
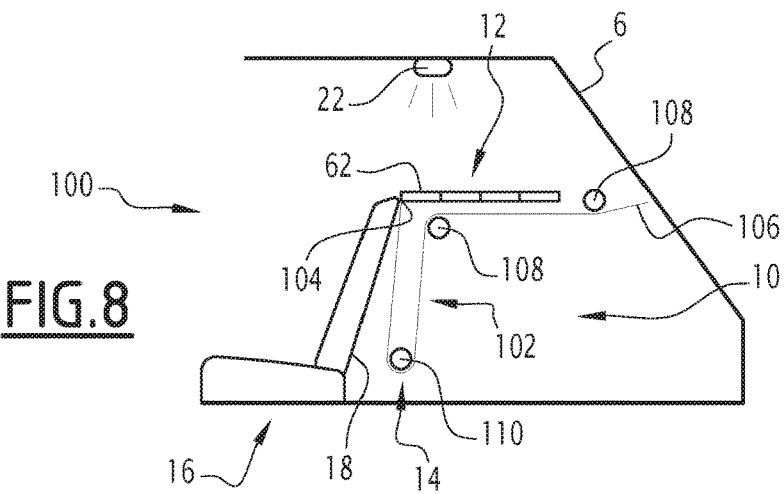
FIG. 8 is a diagrammatic side view of a rear motor vehicle assembly according to a third embodiment of the invention, the tray being in a concealing position.

FIG. 7 shows a top view of the tray 12 of the rear assembly 90 according to the second embodiment.

For example, as shown in FIG. 7, each panel 60 of the tray 12 includes at least two guide pins 92 adapted to cooperate with each respective guide path 30.

The guide pin 92 is adapted to slide in the trough 42 of the associated guide path. The trough 42 has dimensions complementary to the guide pin 92.

Advantageously, the guide pin 92 is situated at the middle of the length of each panel 60.

A rear vehicle assembly 100 according to a third embodiment will now be described.

The rear assembly according to the third embodiment 100 differs from the rear assemblies 1, 90 previously described in that the drive mechanism 14 is arranged to drive the tray 12 toward the storage position of the passage of the tailgate 6 to the open position and to drive the tray 12 toward the concealing position during the passage of the tailgate 6 to the closed position.

The driving mechanism 14 includes at least one link 102 intended to connect the tray 12 to the tailgate 6 of the vehicle when the tray 12 is mounted in the vehicle.

The rear assembly 100 advantageously comprises two links 102 respectively positioned on the left and right of the tray 12. Advantageously, the links 102 are integrated in the side trims 10.

The link 102 is for example chosen from among a rope, strap, or small chain.

The link 102 has a link end 104 to the first panel 62 of the tray 12 and a traction end 106.

In this embodiment, the link end 104 is fastened to the first panel 62 of the tray 12.

A traction end 106 is fastened to the tailgate 6.

The link 102 is movable between a rest position, in which the link 102 is adapted to pull the tray 12 toward the concealing position, and a working position, in which the link 102 is adapted to pull the tray 12 toward the storage position.

The rear vehicle assembly 100 further comprises a traction device 108 for the link 102 and a return device 110 for the link 102.

The traction device 108 is adapted to move the link 102 into the working position. For example, the traction device 108 comprises a pulley.

The return device 110 of the link is adapted to place the link 102 in its rest position.

The return device 110 is adapted to keep the link 102 tensed between its linking end 106 and its traction end 108.

For example, the return device 110 comprises a spiral spring. As an alternative or complement, the return device 102 comprises a winder.

During the opening of the tailgate 6, the change in position of the tray 12 is done automatically owing to the driving mechanism 14.

Indeed, the traction end 106 of the link 102 moves with the tailgate 6.

The traction device 108 makes it possible to move the entire link 102 during the movement of the traction end 106. The link 102 goes into its working position.

The link end 104 moves. The tray 12 moves with the link 102 toward its storage position.

As long as the tailgate 6 is in its open position, the tray 12 is kept in the storage position by the link 102 in its working position.

When the tailgate 6 is closed, the position change of the tray 12 is done automatically owing to the presence of the return device 110 constraining the link 102 toward its rest position.

A rear vehicle assembly 120 according to a fourth embodiment will now be described. The rear assembly according to the fourth embodiment 120 differs from the rear assembly according to the third embodiment 100 previously described in that the driving mechanism 14 further comprises a linking member 122.

The rear vehicle assembly 120 also differs in that the linking ends 104 of the links 102 are fixed to the linking member 122.

Figure 10:
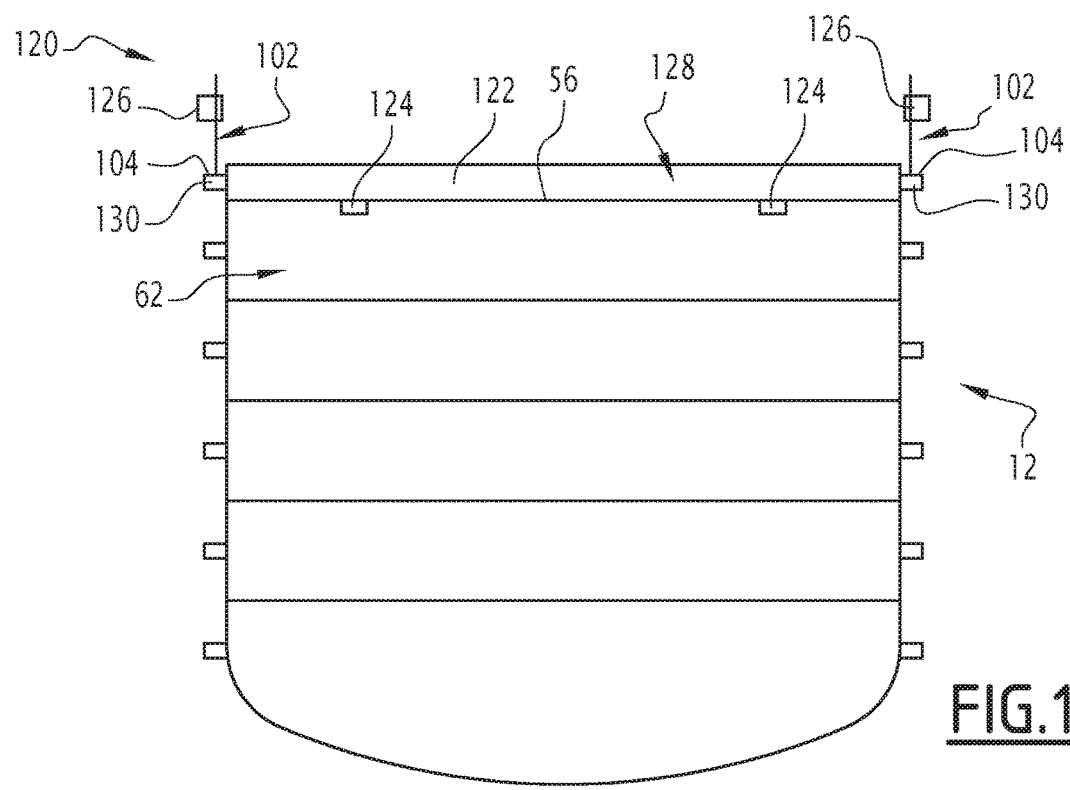
FIG. 10 is a diagrammatic top view of the tray of a rear assembly according to a fourth embodiment.
Figure 11:
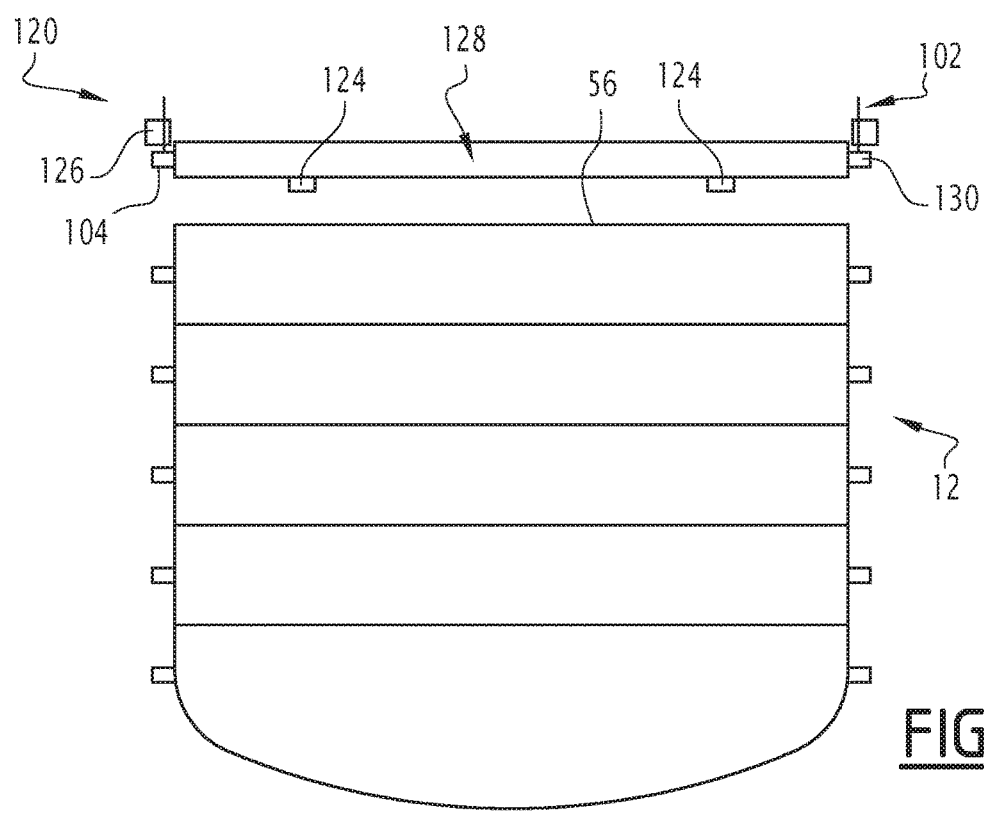
FIG. 11 is a view similar to FIG. 10 of the rear assembly of FIG. 10, the tray being released from the linking member.

The linking member 122 has a linking configuration illustrated in FIG. 10 and a release configuration illustrated in FIG. 11.

In the linking configuration, the linking member 122 is linked to the first panel 62.

In the release configuration, the tray 12 is separated from the linking member 122.

Furthermore, the linking member 122 is movable relative to the side trims 10 between a retracted position and a deployed position.

The passage of the linking member 122 between the retracted position and the deployed position drives the passage of the tray 12 between the concealing position and the storage position when the linking member 122 is in the linking configuration.

For example, the linking member 122 includes a snapping mechanism 124 able to snap on the front edge 56 of the tray 12.

The rear vehicle assembly 120 further comprises a maintaining device 126 able to keep the linking member 122 in the retracted configuration. It is thus possible to keep the linking member 122 in the retracted configuration while the tray 12 is removed.

In the example, the linking member 122 includes a rod 128 including two ends 130. Each end 130 is able to cooperate with one of the two guide paths 30.

When the user wishes to remove the tray 12, the user moves the linking member 122 into the release configuration. The snapping mechanism 124 frees the front edge 56 of the tray 12. The tray 12 is next pulled along the guide path 30 in the deployment direction 34 until it is removed.

The linking member 122 keeps the links 102 in the working position or rest position independently from the removal of the tray 12.

The tray 12 is removed without any risk of tangling the links 102 of the driving mechanism 14.

Furthermore, the linking member 122 is advantageously kept in its position by the maintaining device 126.

When the user wishes to return the tray 12 to its position, he fastens the linking member 122 with the tray 12 via the snapping mechanism 124.

The maintaining device 126 is then tilted in the release configuration such that the tray 12 is again movable in the guide path 30, as before.

The linking member 122 allows easy removal of the tray 12 from the vehicle, without damaging the driving mechanism 14.

The tray 12 thus easily retracts to completely free the space in the trunk and allow lighting situated from above to fully light the entire trunk.

The embodiments described above provide the user with a rear vehicle assembly 1, 90, 100, 120 in which the passage of the tray 12 from the concealing position to the storage position is easy to implement.

In the storage position, the tray 12 in an appropriate place along the rear seats 16 where it is not very bulky.

Alternatively, in particular if the tray 12 is not intended to be hidden by the housing 20 in its storage position, the lower face 54 of the tray 12 is also covered by a cover layer 72 having intermediate zones 78 forming a hinge 68 between each panel 60.

Alternatively, the hinges 68 are non-textile hinges 68.

The invention claimed is:

1. A rear vehicle assembly, comprising:
   two side trims intended to laterally bound a trunk,
   a tray having a front edge and a rear edge, the tray being movable relative to the side trims between a concealing position in which the tray closes off a lower part of the trunk and a storage position,
   the tray comprising at least one first panel defining the front edge of the tray and an opposite edge, and a second panel connected to the first panel by the opposite edge, the panels delimiting two side edges of the tray, each side edge being intended to be placed with regard to an associated side trim,
   wherein each side trim defines a guide path for guiding the tray between the concealing position and the storage position,
   the tray comprising at least one hinge articulating the first panel to the second panel, such that each side edge of the tray is adapted to cooperate with a respective guide path,
   the rear vehicle assembly comprising at least a third panel connected to the second panel by a second hinge articulating the second panel to the third panel, and
   the rear vehicle assembly comprising a driving mechanism adapted to drive the tray from the concealing position to the storage position,
   wherein the driving mechanism comprises a linking member, having a linking configuration in which the linking member is linked to the first panel and a released configuration in which the tray is removable, the linking member being movable between a retracted position and a deployed position, the passage of the linking member between the retracted position and the deployed position driving the passage of the tray between the concealing position and the storage position when the linking member is in the linking configuration.

2. The rear vehicle assembly according to claim 1, comprising a seat, defining a rear surface and a housing extending along the rear surface of the seat, the housing being adapted to receive the tray in the storage position.

3. The rear vehicle assembly according to claim 1, comprising a tailgate movable relative to the side trim between an open position for accessing the trunk and a closed position for closing off the trunk, the driving mechanism being arranged to drive the tray toward the storage position when the tailgate enters the open position and to drive the tray toward the concealing position during the passage of the tailgate toward the closed position.

4. The rear vehicle assembly according to claim 1, wherein the driving mechanism comprises at least one element chosen from among a motor and a control button adapted to activate the change in position of the tray between the concealing position and the storage position.

5. The rear vehicle assembly according to claim 1, wherein each guide path includes a trough and wherein each side edge of the tray comprises at least one guide pin protruding in the guide path and adapted to slide in the trough of the associated guide path.

6. The rear vehicle assembly according to claim 5, wherein each panel of the tray includes at least two guide pins, each guide pin adapted to cooperate with the respective guide path.

7. The rear vehicle assembly according to claim 1, wherein the driving mechanism comprises:
   at least one link positioned in a side trim, the link having a linking end to the first panel of the tray and a traction end, the link being movable between a rest position in which the link is adapted to pull the tray toward the concealing position and a working position in which the link is adapted to pull the tray toward the storage position,
   a traction device of the link adapted to place the link in the working position,
   a return device of the link adapted to place the link in its rest position.

8. The rear vehicle assembly according to claim 7, wherein the traction device comprises a pulley, and the return device comprises a spring.

9. The rear vehicle assembly according to claim 1, the rear vehicle assembly comprising a maintaining device adapted to maintain the linking member in the retracted position.

10. The rear vehicle assembly according to claim 1, wherein the linking member is a rod including two ends, each end being adapted to cooperate with one of the two guide paths.

11. The rear vehicle assembly according to claim 1, wherein the tray comprises a textile cover layer covering each panel, the cover layer having a first covering zone in which it is integral to the first panel, a second covering zone in which it is integral to the second panel, and an intermediate zone between the first covering zone and the second covering zone, the hinge being formed by the intermediate zone of the cover layer.

12. The rear vehicle assembly according to claim 1, comprising a rear panel defining the rear edge of the tray, the tray comprising a hinge articulating each panel to the following panel, such that the side edge of the tray is adapted to cooperate with a respective guide path.

13. The rear vehicle assembly according to claim 12, wherein the drive mechanism includes a handle positioned on the rear panel.

14. The rear vehicle assembly according to claim 1, comprising a light source positioned opposite the lower part of the trunk relative to the tray when the tray is in the concealing position, the light source being adapted to light the lower part of the trunk when the tray is in the storage position.

15. The rear vehicle assembly according to claim 1, wherein the linking member includes a snapping mechanism able to snap on a front edge of the tray.

16. A rear vehicle assembly, comprising:
   two side trims intended to laterally bound a trunk,
   a tray having a front edge and a rear edge, the tray being movable relative to the side trims between a concealing position in which the tray closes off a lower part of the trunk and a storage position,
   the tray comprising at least one first panel defining the front edge of the tray and an opposite edge, and a second panel connected to the first panel by the opposite edge, the panels delimiting two lateral edges of the tray, each lateral edge being intended to be placed with regard to an associated side trim,
   wherein each side trim defines a guide path for guiding the tray between the concealing position and the storage position,
   the tray comprising at least one hinge articulating the first panel to the second panel, such that the side edge of the tray is adapted to cooperate with a respective guide path,
   the rear vehicle assembly comprising at least a third panel connected to the second panel by a second hinge articulating the second panel to the third panel,
   and the rear vehicle assembly comprising a driving mechanism adapted to drive the tray from the concealing position to the storage position,
   wherein the driving mechanism comprises:
   at least one link positioned in a side trim, the link having a linking end to the first panel of the tray and a traction end, the link being movable between a rest position in which the link is adapted to pull the tray toward the concealing position and a working position in which the link is adapted to pull the tray toward the storage position,
   a traction device of the link adapted to place the link in the working position, wherein the traction device comprises a pulley, and
   a return device of the link adapted to place the link in its rest position, wherein the return device comprises a spring.

* * * * *